US012643708B2

(12) United States Patent
Shibata

(10) Patent No.: US 12,643,708 B2
(45) Date of Patent: Jun. 2, 2026

(54) PACKING BOX, TONER CONTAINER, AND METHOD OF ASSEMBLING PACKING BOX

(71) Applicant: Teruo Shibata, Kanagawa (JP)

(72) Inventor: Teruo Shibata, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/779,318

(22) Filed: Jul. 22, 2024

(65) Prior Publication Data

US 2025/0033828 A1 Jan. 30, 2025

(30) Foreign Application Priority Data

Jul. 28, 2023 (JP) ................................ 2023-122914

(51) Int. Cl.

*B65D 5/50* (2006.01)
*B31B 50/26* (2017.01)
*B31B 50/81* (2017.01)
*B31B 100/00* (2017.01)
*B31B 110/35* (2017.01)

(Continued)

(52) U.S. Cl.

CPC .......... *B65D 5/5007* (2013.01); *B31B 50/262* (2017.08); *B31B 50/81* (2017.08); *B65D 5/0245* (2013.01); *G03G 15/0867* (2013.01); *B31B 2100/002* (2017.08); *B31B 2110/35* (2017.08)

(58) Field of Classification Search

CPC .. B65D 5/5007; B65D 5/0245; B65D 25/103; B65D 81/05; B65D 25/10; B65D 2585/689; B65D 5/14; B65D 5/48002; B65D 5/5045; B65D 2571/00166; B65D 2571/00203; B65D 5/42; B65D 5/4266;

(Continued)

(56) References Cited

U.S. PATENT DOCUMENTS 2,723,795 A * 11/1955 Douglas .............. B65D 5/5007 206/418
5,299,734 A 4/1994 Lane (Continued)

FOREIGN PATENT DOCUMENTS

CH 360646 A 2/1962
CN 201472749 U 5/2010

(Continued)

OTHER PUBLICATIONS

Office Action issued Apr. 13, 2026 in Chinese Patent Application No. 202410920933.6, 9 pages.

*Primary Examiner* — Christopher R Demeree
(74) *Attorney, Agent, or Firm* — XSENSUS LLP

(57) ABSTRACT

A packing box of a polygonal tube shape to pack an object includes a plurality of corners and a plurality of holding portions. The plurality of corners are creases along which a flat plate is folded. The plurality of holding portions protrude inward of the packing box, hold the object, and are disposed at positions corresponding to at least two corners of the plurality of corners on one end in a longitudinal direction of the packing box and at positions corresponding to at least two corners of the plurality of corners on the other end in the longitudinal direction of the packing box that is a direction in which the polygonal tube shape extends. The at least two corners on the one end are different from the at least two corners on the other end.

20 Claims, 4 Drawing Sheets

(51) Int. Cl.
*B65D 5/02* (2006.01)
*G03G 15/08* (2006.01)

(58) Field of Classification Search
CPC ............. B65D 5/4279; G03G 15/0867; G03G 2215/0875; B41J 2/17503
USPC ...... 229/183, 120.15, 104, 120.18, 178, 5.5; 206/418, 434, 521, 593, 600, 777
See application file for complete search history.

(56) References Cited

U.S. PATENT DOCUMENTS

| | | | | |
|---|---|---|---|---|
| 5,378,096 | A * | 1/1995 | Keenan | B63B 25/24 206/593 |
| 5,730,289 | A * | 3/1998 | Cappels | B65D 5/5045 229/89 |
| 10,894,646 | B2 * | 1/2021 | Simpkins | B65D 85/20 |
| 11,492,170 | B2 * | 11/2022 | Mellecker | B65D 5/48014 |
| 2009/0173659 | A1 | 7/2009 | Li | |
| 2012/0144783 | A1 * | 6/2012 | Nakamura | B65D 5/505 206/521 |
| 2021/0325800 | A1 | 10/2021 | Shibata et al. | |
| 2024/0140642 | A1 | 5/2024 | Tamaki et al. | |

FOREIGN PATENT DOCUMENTS

| | | | |
|---|---|---|---|
| DE | 932899 | C * | 9/1955 |
| FR | 2 598 385 | A3 | 11/1987 |
| JP | S61-161289 | U | 10/1986 |
| JP | H11-349053 | A | 12/1999 |
| JP | 2006-321530 | A | 11/2006 |
| JP | 3172544 | U | 11/2011 |
| JP | 2012-081976 | A | 4/2012 |
| JP | 2012-121604 | A | 6/2012 |
| JP | 2024-065480 | A | 5/2024 |

* cited by examiner

PACKING BOX, TONER CONTAINER, AND METHOD OF ASSEMBLING PACKING BOX

CROSS-REFERENCE TO RELATED APPLICATION

This patent application is based on and claims priority pursuant to 35 U.S.C. § 119 (a) to Japanese Patent Application No. 2023-122914, filed on Jul. 28, 2023, in the Japan Patent Office, the entire disclosure of which is hereby incorporated by reference herein.

BACKGROUND

Technical Field

Embodiments of the present disclosure relate to a packing box for packing an object such as a toner container, a toner container to be packed in the packing box, and a method of assembling the packing box.

Related Art

A packing box for packing a toner container (an object to be packed) is widely known that is detachably installed in an image forming apparatus such as a copier or a printer. Such a packing box is transported from a manufacturing factory to a transportation destination (delivery destination) such as a user destination in a state in which the toner container (object) is packed in the packing box.

On the other hand, a technology is known that a cushioning material fills a gap between a packing material (packing box) and a toner container packed inside the packing material in order to prevent shocks during transportation from being transmitted to the toner container (object) packed inside the packing material.

SUMMARY

In an embodiment of the present disclosure, a packing box of a polygonal tube shape to pack an object includes a plurality of corners and a plurality of holding portions. The plurality of corners are creases along which a flat plate is folded. The plurality of holding portions protrude inward of the packing box, hold the object, and are disposed at positions corresponding to at least two corners of the plurality of corners on one end in a longitudinal direction of the packing box and at positions corresponding to at least two corners of the plurality of corners on the other end in the longitudinal direction of the packing box that is a direction in which the polygonal tube shape extends. The at least two corners on the one end are different from the at least two corners on the other end.

In another embodiment of the present disclosure, a toner container stored as the object in the packing box includes a plurality of held portions and a substantially cylindrical portion. The plurality of held portions are held by the plurality of holding portions. The substantially cylindrical portion is closer to a center in a longitudinal direction of the toner container than the plurality of held portions. The plurality of held portions are recessed from an outer circumference of the substantially cylindrical portion.

In still another embodiment of the present disclosure, a method of assembling a packing box to pack an object includes a step of folding a flat plate along creases of the flat plate to form the flat plate into a polygonal tube shape having a plurality of corners and a step of protruding a plurality of inter-slit portions, each of which is interposed between two slits in parallel with each other in a direction intersecting the creases when the packing box is in a state of the flat plate, inward of the polygonal tube shape to form a plurality of holding portions to hold the object. The plurality of holding portions are at positions corresponding to at least two corners of the plurality of corners on one end in a longitudinal direction of the packing box that is a direction in which the polygonal tube shape extends, and at positions corresponding to at least two corners of the plurality of corners on the other end in the longitudinal direction, and the at least two corners on the other end are different from the at least two corners on the one end in the longitudinal direction.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
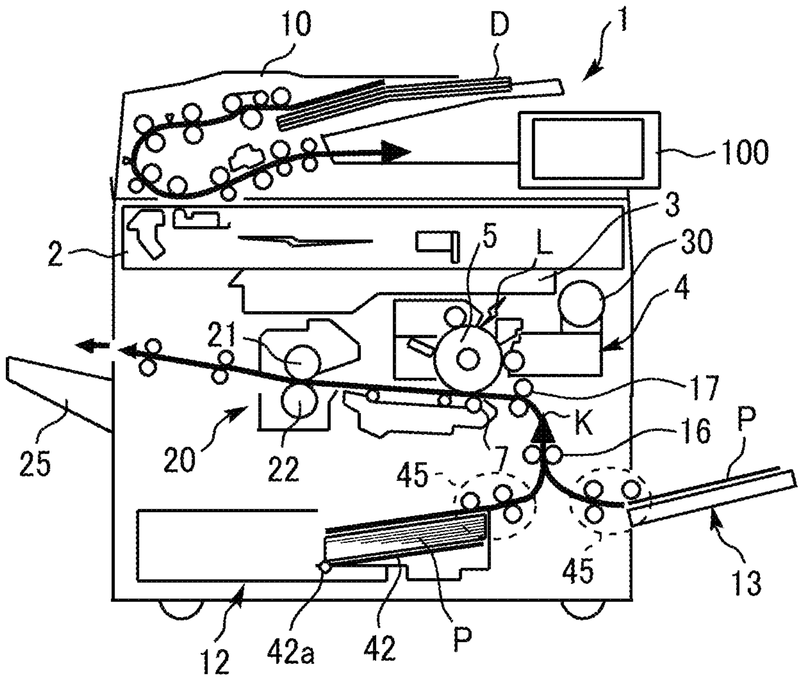
FIG. 1 is a diagram illustrating an overall configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. Like reference signs are assigned to like elements or components and descriptions of those elements or components may be simplified or omitted. As used herein, the singular forms "a," "an," and "the" are intended to include the plural forms as well, unless the context clearly indicates otherwise.

Initially with reference to FIG. 1, a description is given of the overall configuration and operation of an image forming apparatus 1 according to an embodiment of the present disclosure. In FIG. 1, the image forming apparatus 1, which is illustrated as a copier, includes a document reading device 2, an exposure device 3, an imaging device 4, and a transfer device 7 serving as an image forming unit. The document reading device 2 optically reads image data of an original document D. The exposure device 3 irradiates a photoconductor drum 5, which is included in the imaging device 4, with exposure light L according to the image data read by the document reading device 2. The imaging device 4 forms a toner image on the photoconductor drum 5. The transfer device 7 transfers the toner image from the photoconductor 5 onto a sheet P. The image forming apparatus 1 includes a document feeder 10, which is an automatic document feeder (ADF), a sheet feeder 12, and a sheet feeder 13. The document feeder 10 conveys the original document D placed on a sheet tray to the document reading device 2. Each of the sheet feeders 12 and 13 feeds the sheet P stored in the corresponding sheet tray. The sheet feeder 12 is an in-body sheet tray placed inside a housing of the image forming apparatus 1. The sheet feeder 13 is a bypass sheet feeding device protruding on one side of the housing of the image forming apparatus 1. The image forming apparatus 1 includes a conveying roller pair 16, a registration roller pair 17, a fixing device 20, and an ejection tray 25. The conveying roller pair 16 is disposed downstream from a sheet feeding mechanism 45 in the sheet conveyance direction. The registration roller pair 17 serving as a timing roller pair conveys the sheet P toward the transfer device 7. The fixing device 20 includes a fixing roller 21 and a pressure roller 22 to fix the toner image (an unfixed image) on the sheet P. The sheets P are ejected from the housing of the image forming apparatus 1 and stacked onto the ejection tray 25. The image forming apparatus 1 includes a toner container 30 detachably (replaceably) installed on the image forming apparatus 1. The sheet feeder 12 includes a sheet stacker 42 (elevation plate) that is vertically movable. Each of the sheet feeders 12 and 13 includes a sheet feeding mechanism 45. The image forming apparatus 1 includes an operation display panel 100 for inputting a printing operation to be performed in the image forming apparatus 1 and for displaying the status of the image forming apparatus 1.

A description is given below of a regular image forming operation (printing operation) of the image forming apparatus 1 with reference to FIG. 1. The original document D is conveyed (fed) by conveyance rollers of the document feeder 10 from the document loading table in a direction indicated by arrow in FIG. 1, and then passes over the document reading device 2. At this time, the document reading device 2 optically scans the document D passing over the document reading device 2 to read image data. The image data optically read by the document reading device 2 is converted into electrical signals. The electrical signals are transmitted to the exposure device 3 serving as a writer. The exposure device 3 then emits exposure light L, such as laser light, according to the electrical signals (i.e., image data) toward the surface of the photoconductive drum 5 disposed in the imaging device 4.

Meanwhile, while the photoconductor drum 5 rotates in a clockwise direction in FIG. 1, the imaging device 4 performs a predetermined series of image forming processes, such as a charging process, an exposing process, and a developing process, to form a toner image corresponding to the image data on the surface of the photoconductor drum 5. Thereafter, the toner image formed on the surface of the photoconductor drum 5 is transferred by the transfer device 7, onto the sheet P conveyed by the registration roller pair 17. The imaging device 4 includes a charging device, a developing device, a cleaning device, and a charge eliminating device, in addition to the transfer device 7. New toner is supplied to the developing device from the toner container 30 as appropriate. The toner container 30 is formed in a substantially cylindrical shape. When the toner contained therein is exhausted, the toner container 30 is replaced with a new toner container 30. The toner container 30 is distributed on the market as a single unit and is transported from a manufacturing factory to a transportation destination such as a user destination or a service center in a state of being packed in a packing box 50 (see FIG. 2).

On the other hand, a description is given of how the sheet P is conveyed to the transfer device 7 (image forming unit). One of the sheet feeders 12 and 13 included in the image forming apparatus 1 is automatically or manually selected. For example, the sheet feeder 12 disposed inside the housing of the image forming apparatus 1 is selected. Then, the sheet feeding mechanism 45 feeds the uppermost sheet P of the sheets P stored in the sheet feeder 12, toward a sheet conveyance passage K. The sheet P thus fed then passes through the sheet conveyance passage K along which the conveying roller pair 16 is disposed and reaches the position where the registration roller pair 17 is located. When the sheet P reaches the registration roller pair 17, the rotation of the registration roller pair 17 is being stopped. As the leading end of the sheet P contacts the nip region formed by the rollers of the registration roller pair 17, the skew of the sheet P is corrected.

Then, the registration roller pair 17 starts rotating again, and the sheet P is then conveyed toward the transfer device 7 (image forming unit) in synchrony with the movement of the toner image formed on the surface of the photoconductor drum 5 so that the toner image on the sheet P is formed at the correct position. The image formed on the surface of the photoconductor drum 5 is transferred onto the sheet P by the transfer device 7 (a transfer process). After the transfer device 7 transfers the toner image from the photoconductor drum 5 onto the sheet P in the transfer process, the sheet P passes the position of the transfer device 7 to be conveyed to the fixing device 20 along the sheet conveyance passage K. In the fixing device 20, the uppermost sheet P is conveyed between the fixing roller 21 and the pressure roller 22, so that the toner image is fixed to the sheet P under heat applied by the fixing roller 21 and pressure applied by the fixing roller 21 and the pressure roller 22 (a fixing process). After the sheet P bearing the toner image fixed in the fixing process is conveyed out from the fixing nip between the fixing roller 21 and the pressure roller 22, the sheet P is ejected from the housing of the image forming apparatus 1 onto the ejection tray 25 as a sheet having an output image. Thus, a series of the image forming processes (printing operation) is completed.

A description is given of the packing box 50 for the toner container in the present embodiment in detail below. As described above with reference to FIG. 1, the image forming apparatus 1 according to the present embodiment uses the toner container 30 as a consumable item. In other words, the toner container 30 is set in the image forming apparatus 1 when the image forming apparatus 1 is started to be used at a user destination. When the image forming apparatus 1 is started to be used and the toner contained in the toner container 30 runs out, the toner container 30 is removed from the image forming apparatus 1 and a new toner container 30 (which is filled with toner) is attached instead.

Figure 2A:
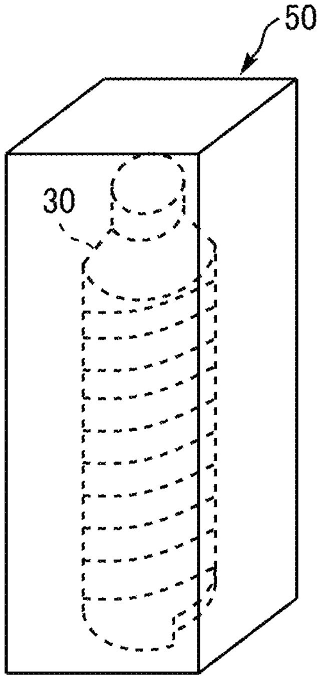
FIGS. 2A and 2B are perspective views of a packing box in which a toner container is packed.
Figure 2B:
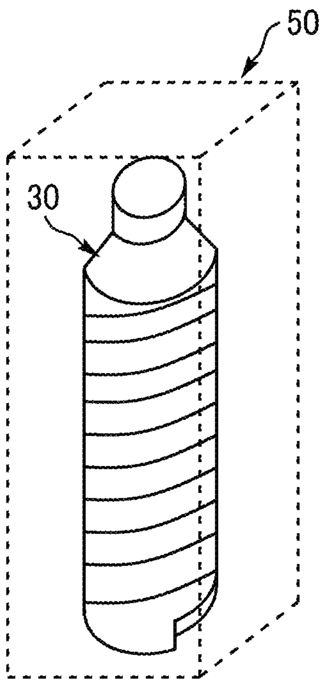

The toner container 30 as an object to be packed is stored (packed) in the packing box 50 as illustrated in FIGS. 2A and 2B before the toner container 30 is attached to the image forming apparatus 1. As illustrated in FIG. 2B, the new toner container 30 (object to be packed) is stored in the packing box 50 illustrated in FIG. 2A. The new toner container 30 is transported to a user destination or stored in a storage destination of the user in a state of being stored in the packing box 50. When the image forming apparatus 1 is started to be used at the user destination, the toner container 30 is taken out from the packing box 50 and is attached (replaced) to the image forming apparatus 1.

The packing box 50 in the present embodiment is formed in a rectangular tube shape (in a square tube shape in the present embodiment) to be capable of packing the toner container 30 (which contains toner therein) as an object therein. The packing box 50 in the present embodiment is formed in a rectangular tube shape as illustrated in FIGS. 4A and 4B to have corner portions M1 to M4 formed by folding creases in the flat plate illustrated in FIG. 3. Specifically, the packing box 50 is made of a rectangular flat plate made of, e.g., cardboard as a material (raw material), and the flat plate has the shape illustrated in the exploded view of FIG. 3. Specifically, the flat plate is formed with five rectangular planes 51A, 51B, 51C, 51D, and 51E partitioned by four parallel creases M1 to M4. A plurality of slits 52A, 52B, 53A, 53B, 54, 55, 56, and 57 are formed in the flat plate. The packing box 50 in a square tube shape is assembled by folding the packing box 50 at substantially right angles along the four creases M1 to M4 to form corner portions and overlapping the planes 51A and 51E at both ends of the flat plate.

With reference to FIG. 4B, the packing box 50 has holding portions 52A, 52B, 53A, and 53B that can protrude inward to hold the toner container 30 (object) at positions corresponding to at least two corners M1 and M3 of the multiple corners M1 to M4 on one end in the longitudinal direction (upper portion in FIG. 4B) and at least two corners M2 and M4 of the multiple corners M1 to M4 on the other end in the longitudinal direction (lower portion in FIG. 4B) different from the corners M1 and M3 on the one end in the longitudinal direction.

In other words, the method of assembling the packing box 50 according to the present embodiment includes a step of folding a flat plate along creases of the folding plate to form the flat plate into a rectangular tube shape having the corners M1 to M4, and a step of inwardly protruding multiple inter-slit portions, each of which is interposed between two slits formed with an interval and in parallel with each other in a direction intersecting the creases when the packing box is in a state of the flat plate, to form the holding portions 52A, 52B, 53A, and 53B that can hold the toner container 30 (object to be packed) by.

Specifically, the packing box 50 in the present embodiment is formed in a square tube shape. The two holding portions 52A and 52B (first holding portions) on one end in the longitudinal direction (upper portion in FIG. 4B) are formed at positions corresponding to the two corners M1 and M3 on a diagonal line among the four corners M1 to M4 (see FIGS. 4B and 5B). On the other hand, the two holding portions 53A and 53B (second holding portions) on the other end in the longitudinal direction (lower portion in FIG. 4B) are formed at positions corresponding to the two corners M2 and M4 (remaining two corners) that are on a diagonal line among the four corners M1 to M4 (see FIGS. 4B and 5C) and different from the two corners M1 and M3 on one end in the longitudinal direction. In other words, when the rectangular tubular packing box 50 is projected in the longitudinal direction, the holding portions 52A and 52B on one end in the longitudinal direction and the holding portions 53A and 53B on the other end in the longitudinal direction are disposed at positions that do not overlap. In other words, the holding portions 52A, 52B, 53A, and 53B are formed one by one at positions corresponding to the four corners M1, M2, M3, and M4, respectively.

Figure 3:
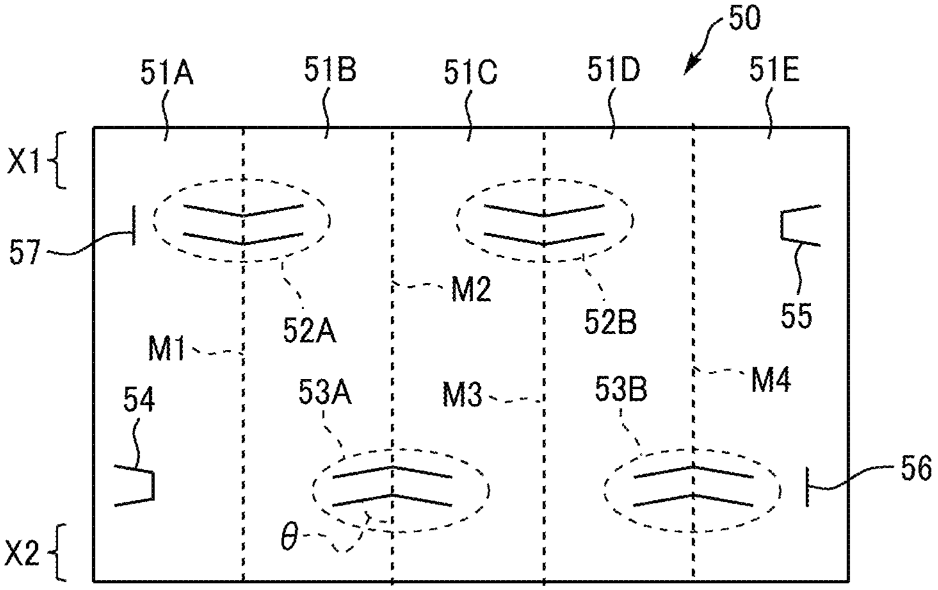
FIG. 3 is a plan view of a flat plate before a packing box is assembled.
Figure 4A:
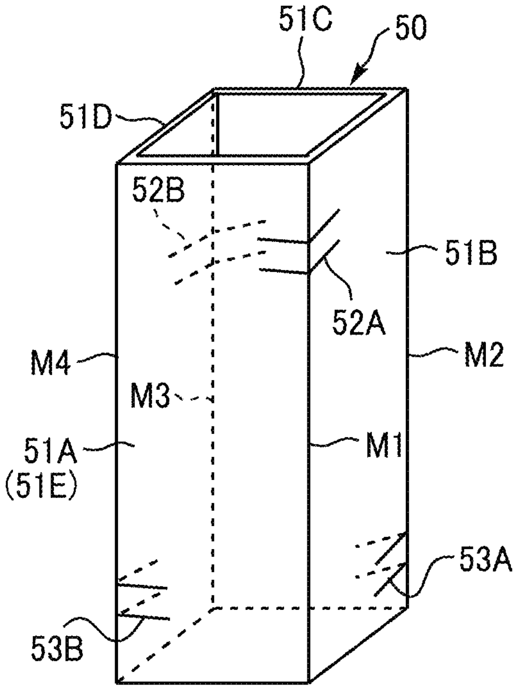
FIGS. 4A and 4B are perspective views of a packing box, illustrating a part of an operation of assembling the packing box.
Figure 4B:
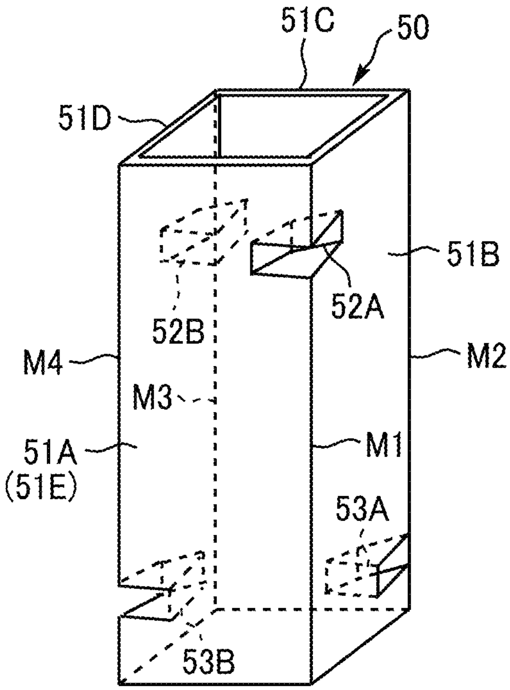

These holding portions 52A, 52B, 53A, and 53B are inter-slit portions protruding inward of the packing box, each of which is interposed between two slits formed with an interval and in parallel with each other in the direction intersecting the creases M1 to M4 when the packing box is in the state of the flat plate (the state before assembly illustrated in FIG. 3). Specifically, the flat plate illustrated in FIG. 3 has two slits that intersect each of the four creases M1 to M4 and are formed at an interval in the direction in which the creases extend. The flat plate is folded along the creases M1 to M4 to form (assemble) the square tube shape as illustrated in FIG. 4A, and then the portions where the slits are formed (the holding portions 52A, 52B, 53A, and 53B) are pushed inward to form the four holding portions 52A, 52B, 53A, and 53B as illustrated in FIGS. 4B, 5A, 5B, and 5C. As illustrated in FIGS. 5B and 5C, each of the cross sections of the four holding portions 52A, 52B, 53A, and 53B has a substantially L shape.

Among the plurality of slits 52A, 52B, 53A, 53B, 54, 55, 56, and 57 formed in the state of the flat plate (the state of FIG. 3), the slits 54, 55, 56, and 57 other than the slits that function as the holding portions 52A, 52B, 53A, and 53B are used when the packing box 50 having a square tube shape is assembled from the state of the flat plate. Specifically, the slits 54 and 55 formed in a tongue shape are inserted into the slits 56 and 57 formed in a slit shape, respectively, and the planes 51A and 51E at both ends are fixed in a state of being overlapped. The method of fixing the planes 51A and 51E at both ends is not limited to this, and for example, the planes 51A and 51E at both ends can be fixed by bonding the opposing surfaces with an adhesive.

Figure 5A:
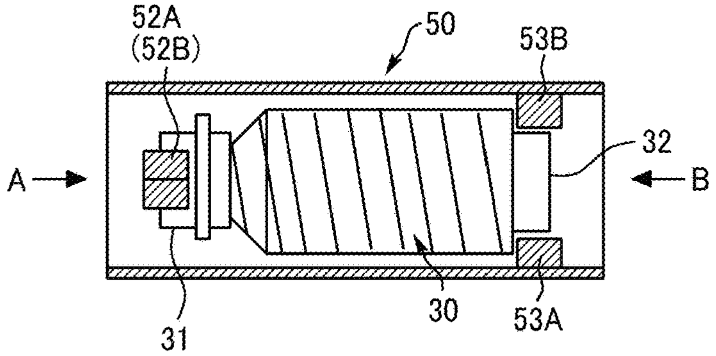
FIG. 5A is a cross-sectional view of a packing box in which a toner container is packed, in a longitudinal direction of the packing box.
Figure 5B:
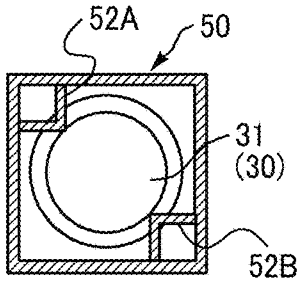
FIG. 5B is a view of the packing box as viewed from a direction A in FIG. 5A.
Figure 5C:
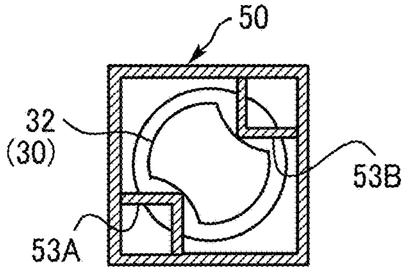
FIG. 5C is a view of the packing box as viewed from a direction B in FIG. 5A.

As illustrated in FIGS. 5A, 5B, and 5C, the toner container 30 is firmly fixed and held in the packing box 50 by the four holding portions 52A, 52B, 53A, and 53B having such a configuration described above. Specifically, the toner container 30 has a substantially cylindrical shape. A cap 31 is disposed to cover a head portion (a portion from which the toner is discharged) of a bottle body (having a concave shape so that a bottle bottom portion 32 functions as a grip) in which a projection spirally protruding toward the inside of the container is formed. In the packing box 50, the cap 31 is held at one end of the toner container 30 in the longitudinal direction and the bottle bottom portion 32 is held at the other end of the toner container 30 in the longitudinal direction. At this time, the cap 31 is held by the first holding portions 52A and 52B, and the bottle bottom portion 32 is held by the second holding portions 53A and 53B. As described above, the cap 31 and the bottle bottom portion 32, which function as held portions held by the plurality of holding portions

52A, 52B, 53A, and 53B, are formed to be recessed from the outer circumference of a substantially cylindrical portion closer to the center in the longitudinal direction than the positions of the cap 31 and the bottle bottom portion 32. Specifically, a portion of the cap 31 that functions as a first held portion has an outer diameter smaller than the outer diameter of a portion that is closer to the center in the longitudinal direction than the position of the portion functioning as the first held portion, and is held by the first holding portions 52A and 52B. In contrast, the bottle bottom portion 32 (grip) that functions as a second held portion has an outer diameter smaller than the outer diameter of a portion that is closer to the center in the longitudinal direction than the position of the bottle bottom portion 32 and has concave portions. The concave portions are held by the second holding portions 53A and 53B.

As described above, the packing box 50 according to the present embodiment is assembled by forming the flat plate having the slits 52A, 52B, 53A, and 53B into a square tubular shape with the creases as the corners M1 to M4 and then pushing the slits 52A, 52B, 53A, and 53B inward to function as the holding portions. Accordingly, the toner container 30 can be securely fixed and held relatively easily without disposing a buffer material for filling the gap between the toner container 30 and the packing box 50, without increasing the cost and complexity, and without reducing the ease of taking out the toner container 30 from the packing box 50. Accordingly, an inconvenience that the toner container 30 jumps out of the packing box 50 during transportation from the manufacturing factory to the transport destination (delivery destination), and an inconvenience that the toner container 30 moves around in the packing box 50 due to vibration during transportation, are reduced. Accordingly, the toner in the toner container 30 is less likely to aggregate unevenly on one end in the longitudinal direction.

Figure 7A:
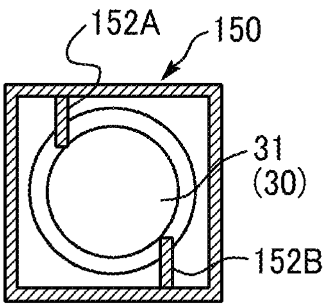
FIG. 7A is a view of a packing box according to a comparative example in which a toner container is packed, as viewed from one end in a longitudinal direction of the packing box.
Figure 7B:
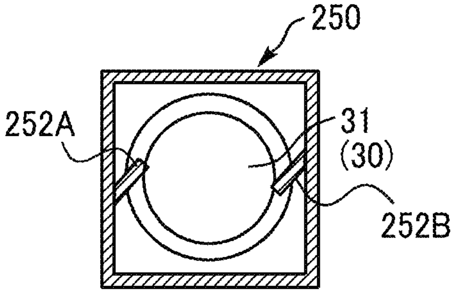
FIG. 7B is a view of a packing box according to a comparative example in which a toner container is packed, as viewed from one end in a longitudinal direction of the packing box.

In particular, the two first holding portions 52A and 52B are arranged on diagonal line. The two second holding portions 53A and 53B are also arranged on a diagonal line. The holding portions 52A, 52B, 53A, and 53B are positioned at the corners M1, M3, M2, and M4, respectively, different from each other. Accordingly, the toner container 30 can be held in the packing box 50 in a balanced and efficient manner. Each of the holding portions 52A, 52B, 53A, and 53B is formed in a substantially L shape to straddle corresponding one of the corners M1 to M4, and has a root on one end and another root on the other end that are connected to adjacent planes of the toner container 30. Specifically, in the first holding portion 52A straddling the first corner M1, a root on one end is connected to the first plane 51A and another root on the other end is connected to the second plane 51B. Such a configuration can enhance the mechanical strength of the holding portions 52A, 52B, 53A, and 53B compared to holding portions 152A and 152B (252A and 252B) formed such that one end is a free end as in a packing box 150 (250) illustrated in FIG. 7A (or FIG. 7B) as a comparative example.

With reference to FIGS. 5A to 5C, in the present embodiment, the toner container 30 (object to be packed) is held without contacting any other portion than the holding portions 52A, 52B, 53A, and 53B inside the packing box 50. In other words, in the packing box 50, the toner container 30 floats in the air except for the portions held by the holding portions 52A, 52B, 53A, and 53B, and there is a lot of space between the packing box 50 and the toner container 30. With such a configuration, even if the packing box 50 vibrates during transportation or an unexpected external force is applied to the packing box 50, the vibration or the external force is less likely to be directly transmitted to the toner container 30. Accordingly, the above-described effect of the present disclosure is more likely to be exhibited.

With reference to FIGS. 5A to 5C, the holding portions 52A, 52B, 53A, and 53B restrict the movement of the toner container 30 (object to be packed) in the longitudinal direction (the left-and-right direction in FIG. 5A). In other words, the toner container 30 is nipped by the first holding portions 52A and 52B and the second holding portions 53A and 53B so that the toner container 30 does not largely move in the longitudinal direction in the packing box 50. Such a configuration makes it easier to exhibit the above-described effect of the present disclosure.

Figure 6:
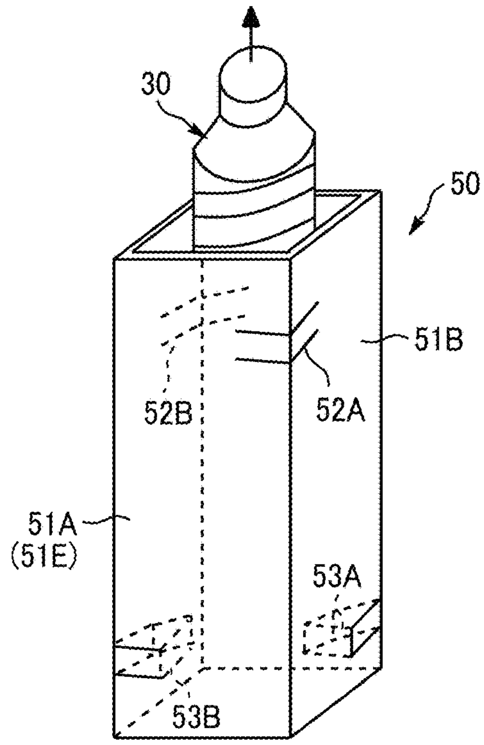
FIG. 6 is a perspective view of a packing box, illustrating an operation of taking out the toner container from the packing box.

With reference to FIG. 6, the holding portions (at least two holding portions) on one end or the other end in the longitudinal direction of the holding portions 52A, 52B, 53A, and 53B are pulled out toward the outside of the rectangular tube shape, so that the toner container 30 (object to be packed) can be taken out from the packing box 50. Specifically, in the example of FIG. 6, in the packing box 50 (in the state of FIGS. 2A, 2B, 5A, 5B, and 5C) in which the toner container 30 is packed, the first holding portions 52A and 52B folded inward among the first holding portions 52A and 52B and the second holding portions 53A and 53B are folded back outward (in the state of FIG. 6), so that the toner container 30 can be taken out in the direction indicated by an arrow in FIG. 6 from one end in the longitudinal direction (on which the first holding portions 52A and 52B are disposed). When the toner container 30 is inserted into the empty packing box 50, the operation opposite to the above-described operation at the time of taking out the toner container 30 is performed.

With reference to FIG. 3, in the present embodiment, the slits for forming the holding portions 52A, 52B, 53A, and 53B in the flat plate are formed to be inclined with respect to a direction perpendicular to the creases M1 to M4 (a horizontal direction in FIG. 3). Specifically, all the slits for forming the holding portions 52A, 52B, 53A, and 53B are formed in a V shape (the vertex of the V shape faces the center in the longitudinal direction) to straddle the creases M1, M3, M2, and M4, respectively. Accordingly, in the first holding portions 52A and 52B, the vertex of the L shape faces downward in FIG. 4B, and in the second holding portions 53A and 53B, the vertex of the L shape faces upward in FIG. 4B. With such a configuration, the toner container 30 in the packing box 50 is more likely to be held by the holding portions 52A, 52B, 53A, and 53B with a strong force toward the center in the longitudinal direction than in a case where the holding portions 52A, 52B, 53A, and 53B (slits) are formed at right angles to the corners M1 to M4 without being inclined.

With reference to FIGS. 5A to 5C, each of the holding portions 52A, 52B, 53A, and 53B is formed at a position shifted from an edge on one end or the other end of the toner container 30 in the longitudinal direction toward the center in the longitudinal direction. Specifically, with reference to FIG. 3, the slits for forming the first holding portions 52A and 52B are formed at positions shifted from the edge on one end in the longitudinal direction by the length X1, and the slits for forming the second holding portions 53A and 53B are formed at positions shifted from the edge on the other end in the longitudinal direction by the length X2. As illustrated in FIG. 5A, the toner container 30 (object to be packed) is held in the packing box 50 so that the toner container 30 does not protrude from both edges of the packing box 50 in the longitudinal direction. With such a configuration, the packing performance of the toner container 30 in the packing box 50 is enhanced, and an inconvenience that a foreign object entering the inside from the openings at both edges adheres to the toner container 30 is less likely to occur as compared with a case where the holding portions 52A, 52B, 53A, and 53B are formed at positions closest to the edges in the longitudinal direction. The mechanical strength of the holding portions 52A, 52B, 53A, and 53B can be enhanced as compared with the case where the holding portions 52A, 52B, 53A, and 53B are formed at positions closest to the edges in the longitudinal direction.

Modification

Figure 8:
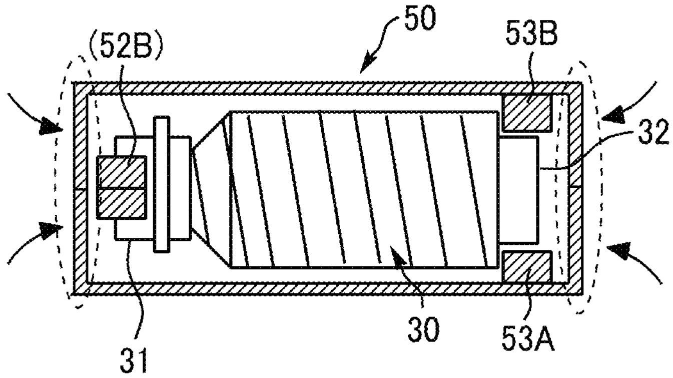
FIG. 8 is a cross-sectional view of a packing box according to a modification, in which a toner container is packed, in a longitudinal direction of the packing box.

As illustrated in FIG. 8, in the packing box 50 according to the modification, peripheral portions on one end and the other end in the longitudinal direction (portions corresponding to the distances X1 and X2 in FIG. 3, and portions surrounded by broken lines in FIG. 8) are folded or crushed toward the center in the longitudinal direction. With such a configuration, the packing performance of the toner container 30 in the packing box 50 is enhanced, and an inconvenience that a foreign object enters the inside of the packing box 50 from the outside is less likely to occur.

As described above, the packing box 50 according to the present embodiment is a rectangular tubular packing box 50 formed to be capable of packing the toner container 30 (object to be packed) therein and having the corners M1 to M4 formed by folding the flat plate along the creases. The packing box 50 has the holding portions 52A, 52B, 53A, and 53B that can protrude inward to hold the toner container 30 at positions corresponding to at least two corners M1 and M3 of the multiple corners M1 to M4 on one end in the longitudinal direction and at least two corners M2 and M4 of the multiple corners M1 to M4 on the other end in the longitudinal direction different from the corners M1 and M3 on the one end in the longitudinal direction. With such a configuration, the toner container 30 packed in the packing box 50 can be sufficiently fixed without increasing the cost of the packing box 50, complicating the packing box 50, and reducing the ease of taking out the toner container 30 from the packing box 50.

In the present embodiment, the packing box 50 packs, as an object to be packed, the toner container 30 detachably attached to the image forming apparatus 1. However, the object to be packed in the packing box 50 to which the present disclosure is applied is not limited to the toner container 30, and the present disclosure can be applied to a packing box for packing a developing device containing developer therein as an object to be packed, or a packing box for packing a process cartridge in which the above-described developing device and an imaging member such as a photoconductor drum are united as an object to be packed. The present disclosure can be applied to all packing boxes for packing an object, not only another object (unit) detachably attached to an image forming apparatus, but also an object unrelated to the image forming apparatus. In the present embodiment, the square tubular packing box 50 is used as a rectangular tubular packing box, but a polygonal tubular packing box other than the square tubular packing box may be used as the rectangular tubular packing box. Even in such a case, advantageous effects equivalent to the effects of the above-described embodiments can be obtained.

The above-described embodiments and modifications are illustrative and do not limit this disclosure. Thus, numerous additional modifications and variations are possible in light of the above teachings. For example, elements and/or features of different illustrative and exemplary embodiments herein may be combined with each other and/or substituted for each other within the scope of this disclosure and appended claims. Further, features of components such as the number, the position, and the shape are not limited to the above-described embodiments, and thus may be set to any number, position, and shape suitable for an embodiment of the present disclosure.

Aspects of the present disclosure may be, for example, combinations of first to eleventh aspects as follows.

First Aspect

A packing box (e.g., the packing box 50) to pack an object (e.g., the toner container 30) has a polygonal tube shape and a plurality of corners (e.g., the corners M1, M2, M3, and M4) formed by folding a flat plate along creases of the flat plate. The packing box has a plurality of holding portions (e.g., the holding portions 52A, 52B, 53A, and 53B) to protrude inward of the packing box and hold the object. The plurality of holding portions are disposed at positions corresponding to at least two corners of the plurality of corners on one end in a longitudinal direction of the packing box and at least two corners of the plurality of corners on the other end in the longitudinal direction, when the longitudinal direction is a direction in which the polygonal tube shape extends. The at least two corners on the one end are different from the at least two corners on the other end.

Second Aspect

In the packing box (e.g., the packing box 50) according to the first aspect, the plurality of holding portions (e.g., the holding portions 52A, 52B, 53A, and 53B) are a plurality of inter-slit portions to protrude inward of the packing box, and each of the plurality of two-slit portions is interposed between two slits formed with an interval and in parallel with each other in a direction intersecting the creases when the packing box is in a state of the flat plate.

Third Aspect

In the packing box (e.g., the packing box 50) according to the second aspect, the two slits are formed to be inclined with respect to a direction perpendicular to the creases.

Fourth Aspect

In the packing box (e.g., the packing box 50) according to any one of the first to third aspects, the object (e.g., the toner container 30) is held inside the packing box without contacting a portion other than the holding portions (e.g., the holding portions 52A, 52B, 53A, and 53B).

Fifth Aspect

In the packing box (e.g., the packing box 50) according to any one of the first to fourth aspects, the plurality of holding portions (e.g., the holding portions 52A, 52B, 53A, and 53B) restrict the object (e.g., the toner container 30) from moving in the longitudinal direction. The object can be taken out by pulling out the at least two holding portions on the one end or the other end in the longitudinal direction toward the outside of the polygonal tube shape of the packing box.

Sixth Aspect

In the packing box (e.g., the packing box 50) according to any one of the first to fifth aspects, the packing box is formed in a square tube shape. Two holding portions (e.g., the holding portions 52A, 52B, 53A, and 53B) on the one end in the longitudinal direction are formed at positions corresponding to two corners (e.g., the corners M1, M2, M3, and M4) on a diagonal line among the four corners. Two holding portions on the other end in the longitudinal direction are formed at positions corresponding to two corners on a diagonal line among the four corners, which are different from the two corners corresponding to the two holding portions on the one end.

Seventh Aspect

In the packing box (e.g., the packing box 50) according to any one of the first to sixth aspects, each of the plurality of holding portions (e.g., the holding portions 52A, 52B, 53A, and 53B) is formed at a position shifted from an edge on one end or the other end in the longitudinal direction to a center of the packing box in the longitudinal direction. The object (e.g., the toner container 30) is held not to protrude from both edges of the packing box in the longitudinal direction.

Eighth Aspect

In the packing box (e.g., the packing box 50) according to the seventh aspect, peripheral portions on the one end and the other end in the longitudinal direction are folded or crushed toward the center of the packing box in the longitudinal direction.

Ninth Aspect

In the packing box (e.g., the packing box 50) according to any one of the first to eighth aspects, the object (e.g., the toner container 30) is a toner container in which toner is stored.

Tenth Aspect

A toner container (e.g., the toner container 30) stored as the object in the packing box (e.g., the packing box 50) according to any one of the first to ninth aspects is formed in a substantially cylindrical shape. The toner container includes a plurality of held portions (e.g., the cap 31 and the bottle bottom portion 32) held by the plurality of holding portions (e.g., the holding portions 52A, 52B, 53A, and 53B) and a substantially cylindrical portion closer to a center in a longitudinal direction of the toner container than positions of the plurality of held portions. The plurality of held portions are recessed from an outer circumference of the substantially cylindrical portion.

Eleventh Aspect

A method of assembling a packing box (e.g., the packing box 50) to pack an object (e.g., the toner container 30) therein includes a step of folding a flat plate along creases of the flat plate to form the flat plate into a polygonal tube shape having a plurality of corners (e.g., the corners M1, M2, M3, and M4) and a step of protruding a plurality of inter-slit portions, each of which is interposed between two slits formed with an interval and in parallel with each other in a direction intersecting the creases when the packing box is in a state of the flat plate, inward of the polygonal tube shape to form a plurality of holding portions (e.g., the holding portions 52A, 52B, 53A, and 53B) to hold the object. The plurality of holding portions are formed at positions corresponding to at least two corners of the plurality of corners on one end in a longitudinal direction of the packing box when the longitudinal direction is a direction in which the polygonal tube shape extends, and at positions corresponding to at least two corners of the plurality of corners on the other end in the longitudinal direction that are different from the at least two corners on the one end in the longitudinal direction.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. A packing box of a polygonal tube shape to pack an object, the packing box comprising:

a plurality of corners that are creases along which a flat plate is folded; and a plurality of holding portions to protrude inward of the packing box and hold the object, the plurality of holding portions disposed at positions corresponding to at least two corners of the plurality of corners on one end in a longitudinal direction of the packing box and at positions corresponding to at least two corners of the plurality of corners on another end in the longitudinal direction of the packing box that is a direction in which the polygonal tube shape extends, wherein:

the at least two corners on the one end are different from the at least two corners on said another end, the plurality of holding portions are a plurality of inter-slit portions to protrude inward of the packing box, and each of the plurality of inter-slit portions is interposed between two slits in parallel with each other in a direction intersecting the creases when the packing box is in a state of the flat plate, and the two slits are inclined with respect to a direction perpendicular to the creases.

2. The packing box according to claim 1, wherein:

the object is held inside the packing box without contacting a portion other than the plurality of holding portions.

3. The packing box according to claim 1, wherein;

the plurality of holding portions restrict the object from moving in the longitudinal direction, and at least two holding portions on the one end or the said another end in the longitudinal direction are drawable toward an outside of the polygonal tube shape to allow the object to be taken out.

4. The packing box according to claim 1, wherein:

the packing box has a square tube shape, and the plurality of holding portions includes:

two holding portions on the one end in the longitudinal direction at positions corresponding to two corners on a diagonal line among the plurality of corners; and two holding portions on the other end in the longitudinal direction at positions corresponding to two corners on a diagonal line among the plurality of corners, which are different from the two corners corresponding to the two holding portions on the one end.

5. The packing box according to claim 1, wherein:

each of the plurality of holding portions is at a position shifted from an edge on the one end or the other end in the longitudinal direction to a center of the packing box in the longitudinal direction, and the plurality of holding portions holds the object within a range between both edges of the packing box in the longitudinal direction.

6. The packing box according to claim 5, wherein;

peripheral portions on the one end and the other end in the longitudinal direction are folded or crushed toward the center of the packing box in the longitudinal direction.

7. The packing box according to claim 1, wherein:

the object is a toner container in which toner is stored.

8. A toner container stored as the object in the packing box according to claim 1, the toner container comprising:

a plurality of held portions held by the plurality of holding portions; and a substantially cylindrical portion closer to a center in a longitudinal direction of the toner container than the plurality of held portions, wherein the plurality of held portions are recessed from an outer circumference of the substantially cylindrical portion.

9. A packing box of a polygonal tube shape to pack an object, the packing box comprising:

a plurality of corners that are creases along which a flat plate is folded; and a plurality of holding portions to protrude inward of the packing box and hold the object, the plurality of holding portions disposed at positions corresponding to at least two corners of the plurality of corners on one end in a longitudinal direction of the packing box and at positions corresponding to at least two corners of the plurality of corners on another end in the longitudinal direction of the packing box that is a direction in which the polygonal tube shape extends, wherein:

the at least two corners on the one end are different from the at least two corners on said another end, the packing box has a square tube shape, and the plurality of holding portions includes:

two holding portions on the one end in the longitudinal direction at positions corresponding to two corners on a diagonal line among the plurality of corners; and two holding portions on the other end in the longitudinal direction at positions corresponding to two corners on a diagonal line among the plurality of corners, which are different from the two corners corresponding to the two holding portions on the one end.

10. The packing box according to claim 9, wherein:

the plurality of holding portions are a plurality of inter-slit portions to protrude inward of the packing box, and each of the plurality of inter-slit portions is interposed between two slits in parallel with each other in a direction intersecting the creases when the packing box is in a state of the flat plate.

11. The packing box according to claim 10, wherein:

the two slits are inclined with respect to a direction perpendicular to the creases.

12. The packing box according to claim 9, wherein:

the plurality of holding portions restrict the object from moving in the longitudinal direction, and at least two holding portions on the one end or the other end in the longitudinal direction are drawable toward an outside of the polygonal tube shape to allow the object to be taken out.

13. The packing box according to claim 9, wherein:

the object is a toner container in which toner is stored.

14. A toner container stored as the object in the packing box according to claim 12, the toner container comprising:

a plurality of held portions held by the plurality of holding portions; and a substantially cylindrical portion closer to a center in a longitudinal direction of the toner container than the plurality of held portions, wherein the plurality of held portions are recessed from an outer circumference of the substantially cylindrical portion.

15. A packing box of a polygonal tube shape to pack an object, the packing box comprising:

a plurality of corners that are creases along which a flat plate is folded; and a plurality of holding portions to protrude inward of the packing box and hold the object, the plurality of holding portions disposed at positions corresponding to at least two corners of the plurality of corners on one end in a longitudinal direction of the packing box and at positions corresponding to at least two corners of the plurality of corners on another end in the longitudinal direction of the packing box that is a direction in which the polygonal tube shape extends, wherein:

the at least two corners on the one end are different from the at least two corners on said another end, each of the plurality of holding portions is at a position shifted from an edge on the one end or the other end in the longitudinal direction to a center of the packing box in the longitudinal direction, and the plurality of holding portions holds the object within a range between both edges of the packing box in the longitudinal direction.

16. The packing box according to claim 15, wherein:

the plurality of holding portions are a plurality of inter-slit portions to protrude inward of the packing box, and each of the plurality of inter-slit portions is interposed between two slits in parallel with each other in a direction intersecting the creases when the packing box is in a state of the flat plate.

17. The packing box according to claim 16, wherein:

the two slits are inclined with respect to a direction perpendicular to the creases.

18. The packing box according to claim 15, wherein:

the packing box has a square tube shape, and the plurality of holding portions includes:

two holding portions on the one end in the longitudinal direction at positions corresponding to two corners on a diagonal line among the plurality of corners; and two holding portions on the other end in the longitudinal direction at positions corresponding to two corners on a diagonal line among the plurality of corners, which are different from the two corners corresponding to the two holding portions on the one end.

19. The packing box according to claim 15, wherein:

peripheral portions on the one end and the other end in the longitudinal direction are folded or crushed toward the center of the packing box in the longitudinal direction.

20. The packing box according to claim 15, wherein:

the object is a toner container in which toner is stored.

* * * * *